H. J. Smith,
Hydrogen Gas Mach.
No. 101,171. Patented Mar. 22. 1870.
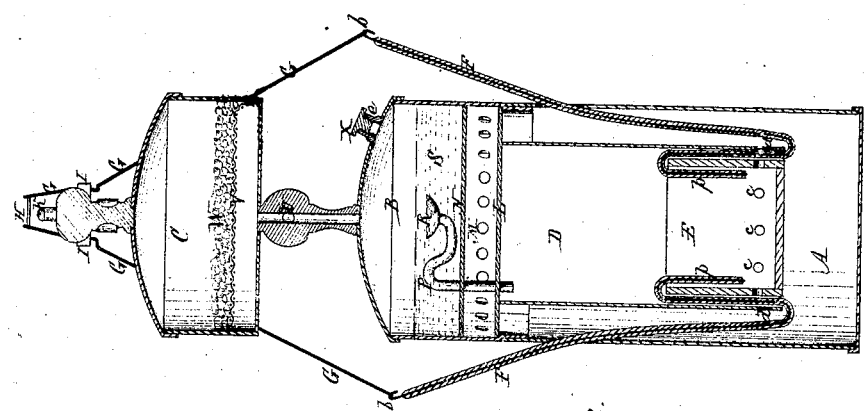
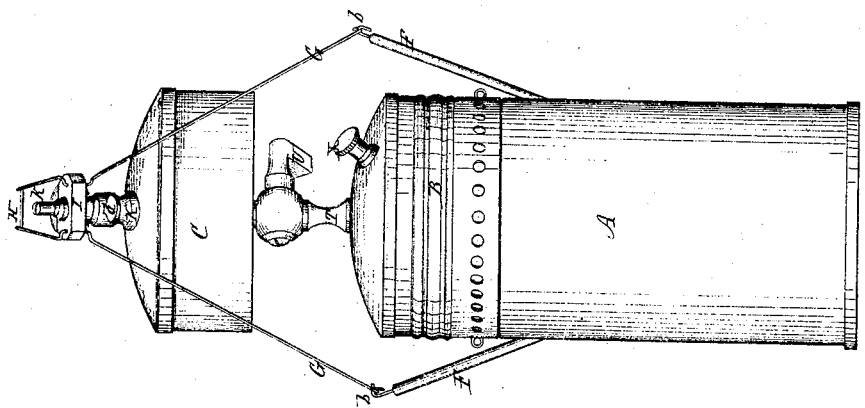
Witnesses
A. E. Bradley
F. W. Howard
Inventor
H. Julius Smith
By his Attorney
Chas. F. Pansbury

United States Patent Office.

H. JULIUS SMITH, OF BOSTON, MASSACHUSETTS.

Letters Patent No. 101,171, dated March 22, 1870.

IMPROVED ELECTRO-HYDROCARBON GAS-MACHINE.

The Schedule referred to in these Letters Patent and making part of the same.

*To all whom it may concern:*

Be it known that I, H. JULIUS SMITH, of Boston, in the county of Suffolk and State of Massachusetts, have invented a new and useful "Electro-Hydrocarbon Gas-Machine," for heating and illuminating purposes; and I do hereby declare the following to be a full and correct description of the same, reference being had to the accompanying drawings, in which—

Figure 1 is a side elevation of the machine or apparatus, and

Figure 2 is a central vertical section of the same.

The same letter indicates the same part in both figures.

The nature of my invention consists—

First, in the production of a light, as the combined effect of electrical action and the combustion of gas, both gas and electricity being generated by one and the same battery;

Second, in the use, in an apparatus for the production of carbureted-hydrogen gas, of electricity to produce the hydrogen which forms one element of the compound gas; and Third, in the construction and operation of a self-regulating apparatus, adapted to the generation of hydrogen by electricity, and the subsequent carbureting and purifying of the gas thus produced, all as hereinafter more particularly described.

The accompanying drawings represent one form of apparatus for carrying my invention into effect, but the dimensions, arrangement, and form of the principal parts of the apparatus can be very considerably varied without departing from the principle of construction which I have devised.

In the drawings—

A marks the lower reservoir, in which the acid for exciting the battery is placed.

Into this reservoir a square reservoir, D, closed at top and open at bottom, descends.

Near the bottom of reservoir D is fixed the battery E, consisting of the usual platinized-copper plates and amalgamated-zinc plates $p$ $p$, suspended in a wooden box, perforated near the bottom with the holes $c$ $c$.

The sides of reservoir D are also perforated at $d$ $d$, to allow of the access of the acid solution to the battery.

To the extreme plates of the battery are attached the insulated wires F, which pass down under the lower edge of reservoir D and then upward, passing out of reservoir A through openings on opposite sides of its upper edge.

These wires are provided with hooks at their upper ends, by which they are united to plain wires G G, which pass up through a hard-rubber insulator, I, and are united by a platinum ribbon, H, above the orifice of the burner K.

The top plate L of chamber D forms the bottom of an open chamber, M, whose sides are perforated, as shown, and which serves to separate the generating-reservoir D from the carbureting-reservoir B, of which the bottom is marked N.

From reservoir D, through plates L and N, passes upward the conducting-pipe P, which is curved in the manner represented, and has a perforated nose or nozzle, R, over its upper orifice.

The reservoir B is filled above the level of the nozzle R with gasoline or other carbureting liquid, which may be introduced through the pipe $e$, closed by the screw-plug X.

The carbureting-reservoir B is connected with the purifying-reservoir C by a pipe, T, controlled by the cock U.

Near the bottom of reservoir C is placed a wire-screen, V, which supports a layer of charcoal, W.

From the top of reservoir C pipes may connect with the gasometer.

In the drawing, a burner, K, is shown projecting from the top of reservoir C, and controlled by the ordinary thumb-valve $a$.

The operation is as follows:

The acid solution being introduced into the reservoir A, and the reservoir B being properly charged with gasoline, the action commences by the decomposition of the water by the battery E, and the consequent rapid generation of hydrogen gas.

This hydrogen passes up through pipe P, and escapes through nozzle R under the surface of the gasoline S, by which it becomes carbureted.

It then rises through pipe T into the purifying-chamber C, where, after passing through charcoal or other purifying medium W, it is ready for use. It may then be conducted to the gasometer, through pipes properly arranged for that purpose. In a small apparatus, such as that represented in the drawing, it may be conducted directly to the burner K.

The current of electricity passing through the platinum ribbon produces both heat and light, from its action upon the ribbon, and thus affords the means of lighting the burner and of increasing the brilliancy of the light, by assisting the hydrogen in consuming the carbon derived from the carbureting material.

As long as the gas generated is being consumed or withdrawn from the apparatus, the action of the battery will continue to supply it, but as soon as the gas ceases to be drawn off, the accumulation of gas in reservoir D will force the acid solution down out of contact with the battery-plates, when the electrical action will cease, and the plates no longer be subjected to erosion.

Having thus fully described my invention,

What I claim, and desire to secure by Letters Patent, is—

1. The combination of electrical action and the combustion of gas in the production of light and heat, when both the gas and the electricity employed are generated by the same battery or source of electricity, as described.

2. In an apparatus for the production of carbureted-hydrogen gas, the application of a battery, or other generator of electricity, to the liberation of the hydrogen which enters into the composition of the illuminating-gas, substantially in the manner specified.

3. The arrangement of the reservoir A, battery E, and reservoir D, substantially in the manner described, for the purpose of making the gas-generating portion of the apparatus self-regulating, as set forth.

4. The arrangement for conjoint operation with the generating-reservoir D of the carbureting-reservoir B and the purifying-reservoir C, substantially in the manner stated.

5. The combination with an electrical gas-generating apparatus, constructed and operating substantially as described, of wires arranged to conduct the electrical current through a platinum ribbon placed near the orifice of the gas-burner, substantially in the manner and for the purpose specified.

The above specification of my said invention signed and witnessed at Boston, this 3d day of November, A. D. 1869.

H. JULIUS SMITH.

Witnesses:
    SAML. C. MOORE,
    L. A. BIGELOW.